(12) United States Patent
Denny

(10) Patent No.: US 6,372,270 B1
(45) Date of Patent: Apr. 16, 2002

(54) DRINK MIX APPARATUS FOR MAKING PERSONAL QUANTITIES OF BEVERAGE

(76) Inventor: Sean P. Denny, 2417 S. Eleventh St., Springfield, IL (US) 62703

( * ) Notice: Subject to any disclaimer, the term of this patent is extended or adjusted under 35 U.S.C. 154(b) by 0 days.

(21) Appl. No.: 09/571,857

(22) Filed: May 16, 2000

Related U.S. Application Data

(60) Provisional application No. 60/136,086, filed on May 26, 1999.

(51) Int. Cl.[7] .................. B65D 25/08; B65D 81/32
(52) U.S. Cl. .................. 426/77; 426/66; 426/83; 426/112; 426/115; 426/120; 215/DIG. 8; 206/219; 99/316; 99/322; 99/323
(58) Field of Search .................. 426/120, 115, 426/112, 77, 83, 84, 66; 99/323, 316, 322; 206/219, 222; 215/DIG. 8

(56) References Cited

U.S. PATENT DOCUMENTS

| | | | |
|---|---|---|---|
| 180,132 A | | 7/1876 | Hoard et al. |
| 1,489,806 A | | 4/1924 | Anderson |
| 1,785,878 A | * | 12/1930 | Schachter .................. 99/322 |
| D100,412 S | | 7/1936 | Carp |
| 2,073,273 A | * | 3/1937 | Wetstein .................. 426/120 |
| 2,631,521 A | * | 3/1953 | Atkins .................. 426/120 |
| 2,694,641 A | * | 11/1954 | Atwood .................. 206/219 |
| 2,766,755 A | * | 10/1956 | Greene .................. 206/219 |
| 2,815,755 A | * | 12/1957 | Anastor .................. 206/222 |
| 2,995,998 A | * | 8/1961 | Howland .................. 99/322 |
| 3,102,465 A | | 9/1963 | Montesano |
| 3,156,369 A | * | 11/1964 | Bowes et al. .................. 206/222 |

(List continued on next page.)

FOREIGN PATENT DOCUMENTS

| | | | | |
|---|---|---|---|---|
| DE | 2459683 | * | 10/1975 | .................. 206/222 |
| EP | 158511 | | 10/1985 | |
| GB | 480596 | | 2/1938 | |
| GB | 623195 | | 5/1949 | |
| GB | 1042626 | * | 9/1965 | .................. 206/222 |
| GB | 2250425 | | 6/1992 | |

*Primary Examiner*—Steven Weinstein
(74) *Attorney, Agent, or Firm*—Richard C. Litman

(57) ABSTRACT

The present invention comprises various methods and apparatus for making or brewing personal quantities of beverages using bottled water, either in a conventional or specially formed bottle. One embodiment includes a cap assembly having an outer attachment portion and a plunger portion fitting within the attachment portion. The two portions define a chamber therein containing a drink mix, one or more tea bags, etc. A seal is provided to prevent mixing of the drink mix and water within the bottle until desired. When the plunger is pushed downwardly, it drives the drink mix through the seal, bursting the seal and deploying the drink mix or tea bags into the water within the bottle. In another embodiment, the bottle and drink mix are packaged together, with the bottle including a pocket formed in the side thereof and the drink mix secured in the pocket by a label extending thereacross. Yet another embodiment includes a conventional bottle, with the label having a pocket formed therein. The label may have fan fold or accordion fold sides, for forming an open pocket after opening for insertion of a spent tea bag or the like therein for disposal. The labels preferably include weakening lines and a pull tab for opening the pocket to access the drink mix or tea bags for insertion into the bottle. Still another embodiment comprises tea bags or drink mix packets which are specially shaped and configured for ease of insertion into the relatively narrow neck of a bottle of water.

3 Claims, 6 Drawing Sheets

U.S. PATENT DOCUMENTS

| | | | |
|---|---|---|---|
| 3,326,363 A | * 6/1967 | Bennet et al. | 426/115 |
| 3,340,873 A | * 9/1967 | Solowey | 206/219 |
| 3,346,388 A | 10/1967 | Andrews et al. | |
| 3,347,410 A | * 10/1967 | Schwartzman | 206/222 |
| 3,439,823 A | * 4/1969 | Morane | 215/DIG. 8 |
| 3,517,604 A | * 6/1970 | Coors | 99/323 |
| 3,537,605 A | * 11/1970 | Solowey | 206/222 |
| 3,590,989 A | 7/1971 | Wittwer | |
| 3,595,439 A | * 7/1971 | Newby et al. | 206/219 |
| 3,657,994 A | 4/1972 | Post | |
| 3,715,189 A | * 2/1973 | Nighohossian et al | 206/219 |
| 3,732,999 A | 5/1973 | Rounkles | |
| 3,756,390 A | * 9/1973 | Abbey et al. | 206/219 |
| 3,756,571 A | * 9/1973 | Winberg | 206/219 |
| 3,831,742 A | * 8/1974 | Cardella et al. | 206/219 |
| 3,861,284 A | * 1/1975 | Costello | 99/323 |
| 3,968,872 A | * 7/1976 | Cavazza | 206/222 |
| 4,221,291 A | * 9/1980 | Hunt | 426/115 |
| 4,235,343 A | 11/1980 | Thompson | |
| 4,550,825 A | * 11/1985 | Sutryn | 206/219 |
| 4,551,336 A | 11/1985 | Chen | |
| 4,592,478 A | 6/1986 | Laconis | |
| 4,821,630 A | 4/1989 | Roberts | |
| 4,986,451 A | 1/1991 | Lowe et al. | |
| 5,050,757 A | 9/1991 | Hidding et al. | |
| 5,129,524 A | * 7/1992 | Holman | 99/323 |
| 5,318,791 A | 6/1994 | Millman et al. | |
| 5,431,276 A | * 7/1995 | Lialin | 426/112 |
| 5,623,865 A | 4/1997 | Sidiropoulos | |
| 5,657,898 A | * 8/1997 | Portman et al. | 426/77 |
| 5,692,644 A | * 12/1997 | Gueret | 206/222 |
| 5,746,113 A | 5/1998 | Ko | |
| 5,772,017 A | * 6/1998 | Kang | 426/115 |
| 5,806,408 A | * 9/1998 | Debacker et al. | 99/322 |
| 5,866,185 A | 2/1999 | Burkett | |
| 5,884,759 A | * 3/1999 | Gueret | 206/219 |
| 5,984,141 A | * 11/1999 | Gibler | 426/120 |
| 6,165,523 A | * 12/2000 | Story | 426/120 |
| 6,170,654 B1 | * 1/2001 | Gartner et al. | 206/222 |

* cited by examiner

DRINK MIX APPARATUS FOR MAKING PERSONAL QUANTITIES OF BEVERAGE

This application claims priority of U.S. Provisional Application Ser. No. 60/136,086, filed May 26, 1999.

BACKGROUND OF THE INVENTION

1. Field of the Invention

The present invention relates generally to devices and methods for brewing tea or mixing other beverages, and more specifically to various embodiments of containers, caps, and dry drink mix or substance containers, for brewing sun tea and/or for making or mixing other beverages from dry powders or the like.

2. Description of the Related Art

The art of brewing tea has been well known for generations. More recently, it has become popular to brew "sun tea," by placing the tea in a container of water, and leaving the container (preferably clear glass) in the sun where the water is warmed due to the infrared radiation produced by the glass from the solar radiation received. In addition, many manufacturers have developed powdered beverage mixes (Kool-Ade, tm, powdered coffees and teas, lemonade and other fruit flavored mixes, etc.) which are adapted for mixing with water to make a beverage.

Various means have been developed for making such beverages, depending upon whether the product must be brewed (i. e., heated and steeped for some period of time), or merely mixed and dissolved. In the case of powdered instant drink mixes, the means used is generally conventional, comprising a container and a mixing spoon, whisk, or the like. The brewing of tea is generally somewhat more involved, due to the need to heat the water and to steep the tea in the heated water for some period of time. Generally, the lower the water temperature, the longer the period of time the tea must steep in the water. However, some hold that the longer steeping process in lower water temperatures is advantageous, in that the tea flavor is not altered to the extent that occurs when it is steeped in nearly boiling water. In any event, various devices have been developed for holding complete or shredded tea leaves for steeping in a container of water, as indicated in the discussion of the related art further below.

In addition, some persons have developed liquid containers including externally accessible compartments for holding various articles (mixes, etc.) which might be associated with the liquid contained within the container. However, these compartmented containers of the prior art each contain some deficiency in comparison to the containers of the present invention, which are specially adapted for separately holding a tea bag or other dry substance for making a beverage, from the liquid contained within the container.

Another aspect of mixing beverages, and particularly the tea brewing process, is that many manufacturers of tea bags and the like produce such bags in a low, flat shape in order to maximize the surface area of the bag relative to the internal volume. While this is beneficial in terms of diffusing the tea more rapidly throughout the liquid, it does no good whatsoever if it is not possible to insert the tea bag into the liquid container. Accordingly, along with the specially adapted containers for the mixing of beverages and brewing of tea therein, the present invention also includes tea or other beverage mix bags which are specially configured for passing easily through the neck of a container having a relatively narrow neck. This aspect of the invention, as well as others described in detail further below, provide significant differences and distinction over the related art of record. A discussion of the related art of which the present inventor is aware, and its differences and distinctions from the present invention, is provided below.

U.S. Pat. No. 180,132 issued on Jul. 25, 1876 to Benjamin F. Hoard et al., titled "Bottle Attachment, " describes a bottle for containing a liquid (medicine, etc.). The bottle has a concave side with flanges extending therefrom, along which a cooperating lid may be slid into place. The resulting receptacle provides for the insertion of an information or advertising brochure or other document therein. The bottle and external container of the present invention differ in that no separate rigid closure need be provided; the present closure is formed by the bottle label.

U.S. Pat. No. 1,489,806 issued on Apr. 8, 1924 to Harry C. Anderson, titled "Paper Container Or Receptacle," describes various shapes of perforated paper elements for holding tea and for submersing in a container of hot water for brewing tea. The Anderson tea containers teach away from the "tea balls" of the prior art, which are formed as openable rigid, hard, perforated metal shells. However, Anderson does not anticipate the need to use a tea bag type container for brewing tea in a larger vessel, where the tea bag cannot be accessed by the fingers. Rather, his tea containers each have an elongate shape with an unperforated upper end, with the upper ends serving as handles. Such a configuration is unworkable with the necked containers of the present invention.

U.S. Pat. No. 3,102,465 issued on Sep. 3, 1963 to Lewis Montesano, titled "Leak-Proof Packaging Infusion Unit," describes a telescoping tubular device in which the outer sleeve forms a cover for the perforated inner sleeve surrounding the tea contents therein. The outer sleeve is extended beyond the inner perforated sleeve, and the perforated sleeve is immersed in the water to diffuse the tea therein. As in the devices of the Anderson '806 U.S. Patent, the Montesano device does not include a string or other means allowing it to be released in a container; rather, the Montesano device must be held in the container during the time the tea is steeping. This renders the Montesano device unsuitable for use with larger containers or for longer periods of time, as in brewing sun tea or the like.

U.S. Pat. No. 3,346,388 issued on Oct. 10, 1967 to Frederick P. Andrews et al., titled "Tea Packet," describes a specially formed tea bag having a toroidal configuration. The Andrews et al. tea bag is unsuited for use in a container having a relatively small neck and cap, as Andrews et al. note that their tea packet is in the configuration of "a ring of a size compatible with a tea cup" (column 1, lines 46–47). The Andrews et al. tea packet thus could not be inserted into the neck of a bottle.

U.S. Pat. No. 3,590,989 issued on Jul. 6, 1971 to John C. Wittwer, titled "Protective Bottle Display And Shipping Container," describes a double bottle type container, in which a glass container is encased within a liquid filled plastic container for shock absorption purposes. Wittwer discloses other articles encased in a separate compartment within an outer bottle, but the receptacle is in the center of the bottle, rather than being formed in the outer wall of the bottle, as in the case of the present invention.

U.S. Pat. No. 3,657,994 issued on Apr. 25, 1972 to Norman W. Post, titled "Combination Container And Dispenser," describes a small, double walled container which hooks over the edge of a cup. The two walls are perforated, and may be turned relative to one another to align the perforations for allowing a drink mix contained therein to be diffused through the liquid in the cup. The device is too large for immersion in a bottle having a relatively narrow neck, and cannot be sealed to a bottle top for dispersing its contents, as in another of the present embodiments.

U.S. Pat. No. 3,732,999 issued on May 15, 1973 to Rodney G. Rounkles, titled "Bottle With External Compartment," describes a bottle having a hinged lid for closing over a compartment formed in the side of the bottle. The device is more closely related to the bottle of the Hoard et al. '132 U.S. Patent discussed further above, than to any of the embodiments of the present invention.

U.S. Pat. No. 3,861,284 issued on Jan. 21, 1975 to Albert D. Costello, titled "Cup Lids For Use With Teabags And The Like," describes various lid embodiments having a wide, flat protrusion for holding a conventional flat tea bag therein. The tea bag is lowered into the water in the cup and allowed to steep, then drawn back upwardly into the protrusion by means of the conventional string on the tea bag. The Costello assembly is not adapted for use in brewing tea or mixing a dry beverage powder in a bottle having a relatively narrow neck, as provided by the various embodiments of the present invention.

U.S. Pat. No. 4,235,343 issued on Nov. 25, 1980 to Harold E. Thompson, titled "Container Assembly," describes a group of three bottles, with the larger bottle having depressions in opposite sides for seating two smaller bottles. No means is disclosed for securing the smaller bottles in the depression, other than providing a tight fit, which is not possible with the flaccid tea bag unit for storage in the depression of a container of the present invention. Rather, the present container with its external depression secures an article therein by means of a wrapper which passes over the depression to seal it closed.

U.S. Pat. No. 4,551,336 issued on Nov. 5, 1985 to Ying-Cheng Chen, titled "Infusion Bag," describes a tea bag or the like having a double opposed conical configuration. The relatively wide structure thus formed cannot be passed through the neck of a bottle without distortion, unlike the tea or drink mix bag configurations of various embodiments of the present invention.

U.S. Pat. No. 4,592,478 issued on Jun. 3, 1986 to Richard Laconis, titled "Container Assembly," describes two outer containers having mirror images to one another and defining a cavity therein when assembled together. The cavity is used to hold another article, and/or container for the other article, therein. The outer containers must be separated from one another to access the article contained within their mutual depressions, unlike the present container invention with its depression formed externally. The Laconis container assembly thus more closely resembles the devices of the Wittwer '989 and Thompson '343 U.S. Patents, than the present invention.

U.S. Pat. No. 4,821,630 issued on Apr. 18, 1989 to Robert E. Roberts, titled "Sun Tea Adapter For Plastic Cartons," describes a cylindrical perforated insert for placing within a conventional plastic milk jug or the like. Tea bags may be placed within the insert, which is then lowered into the water filled jug to steep and make sun tea. One embodiment of the present invention includes a specially formed cap assembly for infusing water within a bottle with tea or other beverage mix. However, the present cap assembly is sealed until use and contains the beverage product therein.

U.S. Pat. No. 4,986,451 issued on Jan. 22, 1991 to Christopher H. Lowe et al., titled "Dispensing Device For Soluble Or Dispersible Material," describes two embodiments of such a device. In one embodiment, a perforated straw-like device is filled with a powdered material for mixing in a liquid. The straw is stirred to dispense the material through the perforations. The second embodiment is similar, but includes a separate sealed compartment containing another additive. Squeezing the sealed compartment causes a seal to rupture, allowing the additive to flow into the perforated compartment where it disperses through the liquid along with the material in the perforated compartment. Neither of the above embodiments comprises a flexible tea bag or the like, and the relatively wider stirring ends teach away from a streamlined shape for insertion into the relatively narrow mouth of a bottle. Moreover, the Lowe et al. devices cannot be contained within a cap which can be removably secured to the bottle, as provided by at least one embodiment of the present invention.

U.S. Pat. No. 5,050,757 issued on Sep. 24, 1991 to Daniel P. Hidding et al., titled "Container System," describes a relatively larger bottle having a recess in one side thereof for frictionally holding a smaller bottle therein. The assembly provides for placement of a relatively smaller supply of medication from the larger bottle into the smaller bottle for convenient carriage. The Hidding et al. bottle assembly more closely resembles the assembly of the Thompson '343 U.S. Patent discussed further above, than any embodiments of the present invention.

U.S. Pat. No. 5,318,791 issued on Jun. 7, 1994 to Paul Millman et al., titled "Apparatus And Method For Cold Water Infusion Of Beverage And Sweetener," describes a special lid assembly having a central post to which a cylindrical column may be secured. The cylindrical column provides for anchoring one or more tea bags thereto, and includes a sweetener diffusion compartment to one side thereof. The apparatus is assembled, and the tea and sweetener are diffused through the water within the container or cup. The present invention includes means for diffusing tea or other drink material into a water container, but differs considerably from the Millman et al. assembly, in that the present invention includes a sealed cap assembly for removable installation to a bottle of water or the like. The present sealed cap assembly is not reusable, and may contain other beverage materials than tea, unlike the Millman et al. device which is only adapted for securing tea bags thereto.

U.S. Pat. No. 5,623,865 issued on Apr. 29, 1997 to Perry Sidiropoulos, titled "Infuser," describes multiple embodiments of a generally cylindrical telescoping device having a porous tube at its lower end and an impervious outer tube for telescoping over the porous tube. The porous tube is filled with tea or the like, with the outer tube covering the porous tube. For using the device, the outer tube is extended to expose the porous tube, which is inserted into the water to diffuse the tea into the water. The Sidiropoulos device thus more closely resembles the device of the Montesano '465 U.S. Patent discussed further above, than the present invention.

U.S. Pat. No. 5,746,113 issued on May 5, 1998 to Lily Ko, titled "Infusion Vessel," describes a cup having a perforated tea holding compartment therewith, either formed integrally with the cup or as a removable compartment. The Ko device thus more closely resembles the apparatus of the '994 U.S. Patent to Post, discussed further above, than it does the present invention.

U.S. Pat. No. 5,866,185 issued on Feb. 2, 1999 to Edward K. Burkett, titled "Method And Device For Dispensing An Ingestible Soluble Material For Further Dissolving In A Liquid," describes a device having a porous cylindrical wall and containing a dry soluble material therein. The outer surface of the tube is coated with a sweetener or other soluble substance. When the device is immersed in water, flow through the porosities diffuses the substance within the tube through the water, with the outer coating also dissolving. The Burkett device thus more closely resembles the device of the '451 U.S. Patent to Lowe, discussed further above and cited as prior art by Burkett, than it does the present invention.

U.S. Pat. No. D-100,412 issued on Jul. 14, 1936 to Bernard Carp, titled "Combination Recessed Bottle," illustrates a design for a relatively larger bottle having a recess with a smaller bottle set within the recess of the larger bottle. The Carp design thus more closely resembles the combination bottle apparatus of the Thompson '343 and Hidding et al. '757 U.S. Patents, than it does the present bottle with its inset wall and label enclosure.

British Patent Publication No. 480,596 accepted on Feb. 22, 1938 to Frederick J. E. Alexander, titled "Improvements In Tea, Coffee Or Like Infusers," describes a rigid container having an impervious bottom and a perforated or screened top portion. Tea, coffee, etc. is placed within the device, which is then closed and immersed in hot water. The device is much too large to be inserted through the neck of a bottle and cannot serve as a removable cap for sealing the bottle, as provided by the infusion method of the present invention. The Alexander device is a variation upon the "tea ball" concept, and does not closely resemble the drink mix infusion embodiments of the present invention.

British Patent Publication No. 623,195 accepted on May 13, 1949 to Winifred M. Waller et al., titled "Improvements In And Relating To Solvent Extraction Devices," describes a rigid container having porous walls, for immersion into a container of hot water. An elongate handle extends from the top of the device. The device is relatively wide and is intended for use in a container having a relatively wide mouth, such as a tea or coffee cup or pot. The device is much too wide to be inserted into the neck of a bottle, as provided by at least one embodiment of the present invention, and does not form a disposable cap for attachment to such a bottle or include any drink mix sealed therein until use, as provided by the present invention. The Waller et al. device more closely resembles the infuser of the '596 British Patent Publication to Alexander, described immediately above, than it does the present invention.

European Patent Publication No. 158,511 published on Oct. 16, 1985 to General Foods Limited, titled "Beverage Infuser Device," describes a low, flat, porous, disposable container including tea or coffee therein. A handle extends from one side of the device for ease of manipulation. The General Foods device is more closely related to a conventional disposable tea bag, with its relatively wide and flat shape, than to any of the tea or beverage mix bags of the present invention, with their relatively narrow and streamlined shape for removable insertion through the relatively narrow neck of a bottle.

Finally, British Patent Publication No. 2,250,425 published on Jun. 10, 1992 to Francis C. Winnington-Ingram, titled "Tea Infusor For Cups And Mugs," describes a rigid framework having porous panels therein for containing tea or similar drink mix. The device is nearly the volume of a conventional coffee mug, and is much too large to be inserted into the neck of a bottle, as provided by the present drink infuser device. Moreover, the Winnington-Ingram device is not economically disposable, does not contain a sealed quantity of tea or other drink mix and means for breaking the seal for use, and does not positively secure to the top of a bottle, as provided by the present infuser device.

None of the above inventions and patents, taken either singly or in combination, is seen to describe the instant invention as claimed.

SUMMARY OF THE INVENTION

The present invention comprises various embodiments of methods and apparatus for making personal quantities of tea, fruit flavored drink from a mix, or other beverages. While the present methods and apparatus are primarily directed to the brewing of sun tea using a personal size water bottle, it will be seen that it may be extended to other container types and sizes and may include other beverages as well.

One embodiment of the present invention comprises a sealed cap assembly having an outer portion providing for positive attachment to the liquid container, with an inner portion serving as a piston or plunger. An internal volume is defined between the two portions, with the volume containing a powdered drink mix, tea bags, etc. The internal volume of the cap assembly is sealed from the contents of the bottle until use. When mixing of the beverage mix is desired, the plunger is pushed downwardly into the surrounding cap structure, forcing the seal to break and dispersing the drink mix into the bottle.

In another embodiment, a water bottle is provided with a depression or receptacle formed in one side thereof. The receptacle provides for containment of one or more tea bags, powdered drink mix packages, etc. The bottle label wraps over and around the receptacle to seal the contents therein. The label may include weakening perforations and/or a pull tab to facilitate access to the contents of the receptacle in the side of the bottle.

Yet another embodiment utilizes a conventional bottle, but with a label having a pocket formed therein or between the label and the side of the bottle. The drink mix package(s) or tea bag(s) is/are enclosed within the pocket, or between the label and the side of the bottle. The label may include accordion or fan fold sides which expand when the label is opened. The opened label thus provides a receptacle for a used tea bag or the like after mixing or brewing the beverage. The tea bags or drink packages supplied with the bottle may be specially configured to have a narrow and/or streamlined shape, in order to fit easily through the relatively narrow neck of the bottle.

Accordingly, it is a principal object of the invention to provide improved methods and apparatus for making or brewing personal quantities of a beverage.

It is another object of the invention to provide an improved apparatus for making or brewing such beverages, comprising a cap assembly including a quantity of beverage mix sealed therein for dispersing the beverage mix into a bottle of water to which the cap assembly has been secured.

It is a further object of the invention to provide an improved apparatus including a water bottle and beverage mix therewith, with the bottle including a pocket or the like formed in one side thereof, and a label extending over the pocket and securing one or more drink mix or tea packets therein.

An additional object of the invention is to provide an improved apparatus comprising a drink bottle with drink mix included therewith, with the drink mix being sealed to the bottle by means of a label having a pocket therein.

Still another object of the invention is to provide an improved means of inserting tea or drink mix packets into a bottle having a relatively narrow neck, by forming the packets to have a narrow and/or streamlined shape for ease of insertion.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of means for making or brewing personal quantities of a mixed or brewed beverage, such as tea or a drink made f rom a powdered mix. In each of the embodiments, the invention includes a bottle or other container of water, along with an appropriate quantity of tea or other drink mix to be mixed or brewed with the water, using the bottle as the mixing or brewing container. In a first embodiment, the cap assembly includes storage and dispersal means for the tea or mix contained therein. In a second embodiment, the bottle includes a receptacle for containing the tea or mix. A third embodiment comprises a bottle label with a pocket therein, for securing the tea or mix to the bottle.

Figure 1:
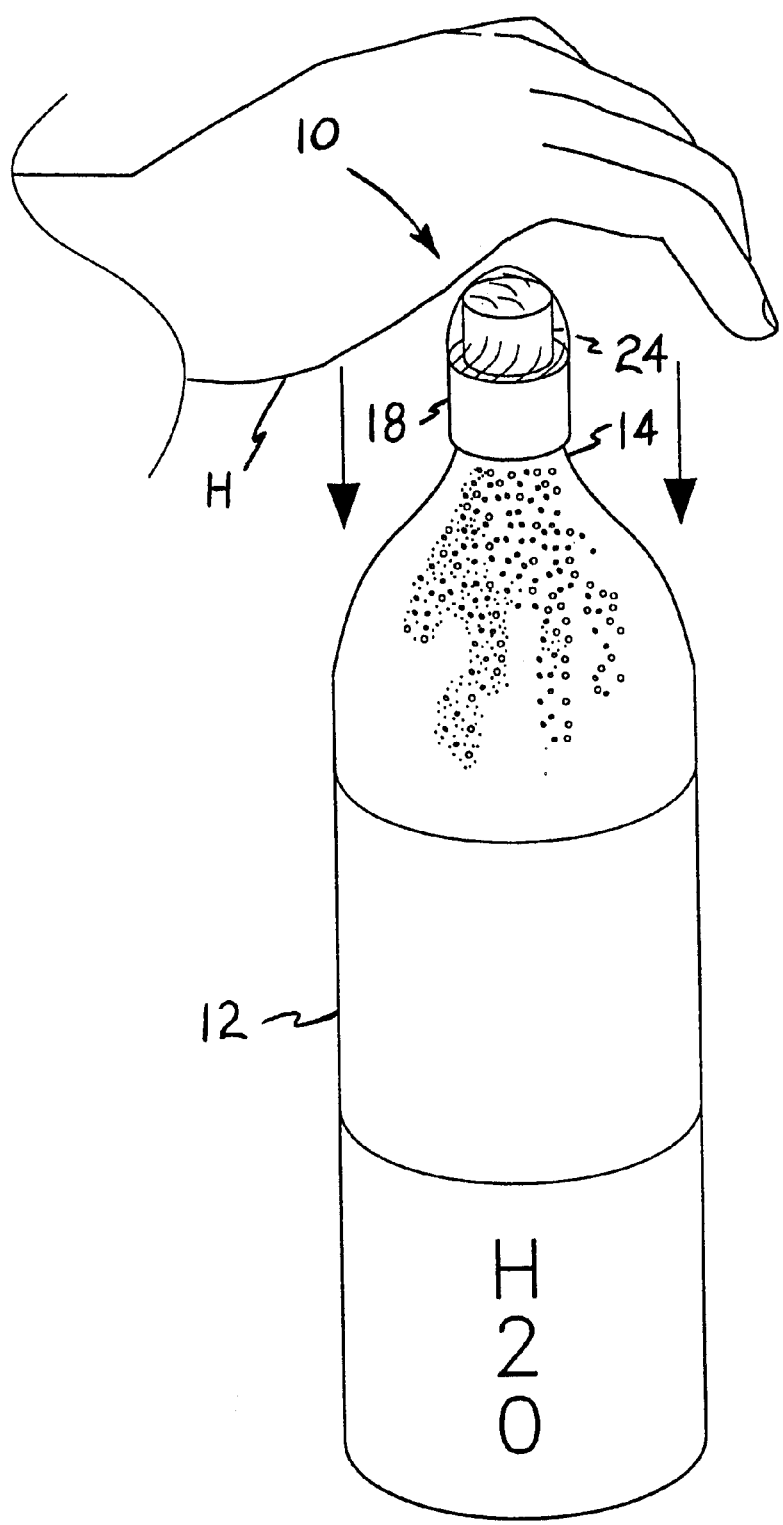
FIG. 1 is a perspective view of the drink mix infusion cap assembly of the present invention, secured to a bottle and showing its use.
Figure 2:
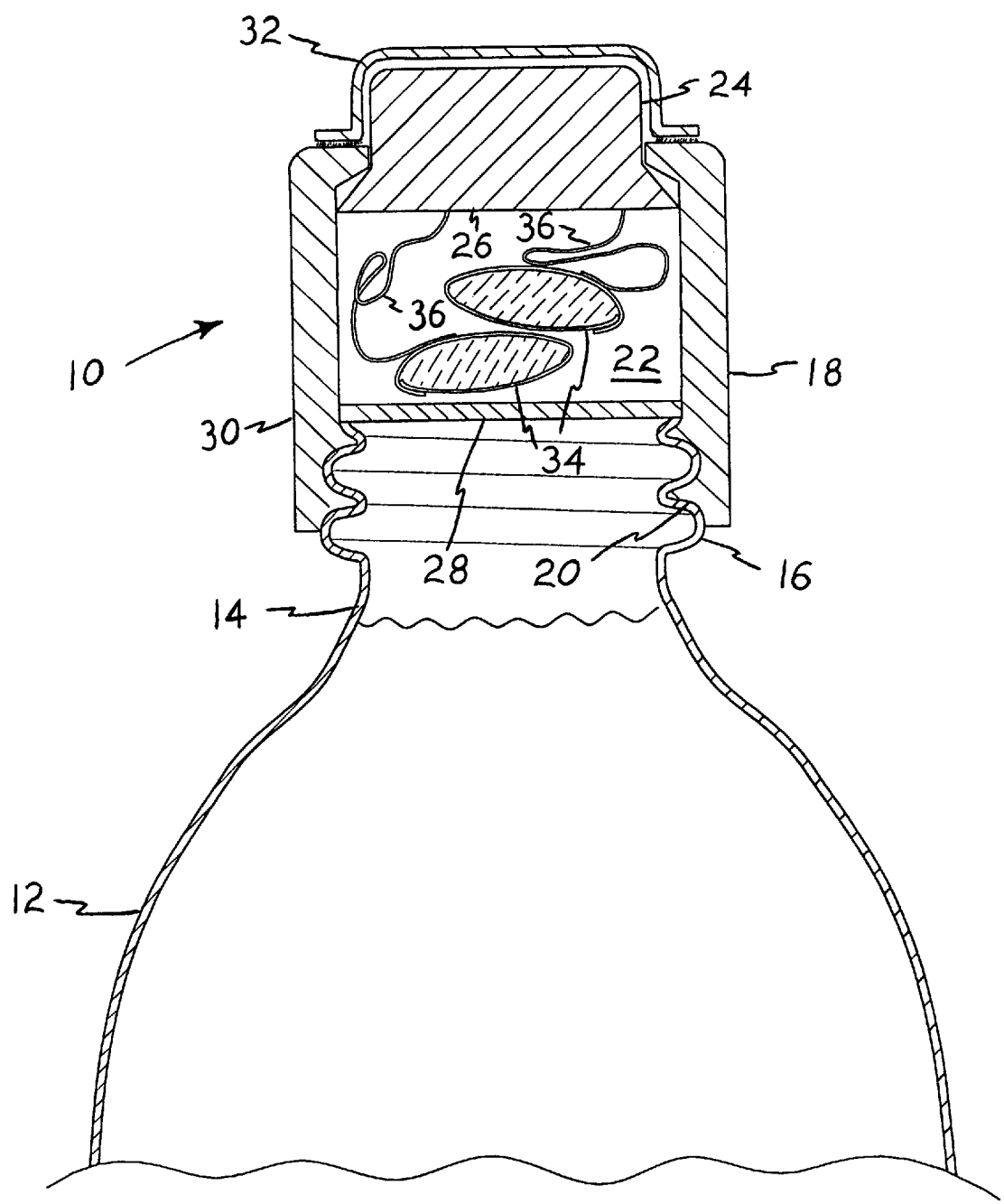
FIG. 2 is a detailed elevation view in section of the cap assembly of FIG. 1 containing a plurality of tea bags, and showing various details of the cap assembly.
Figure 3:
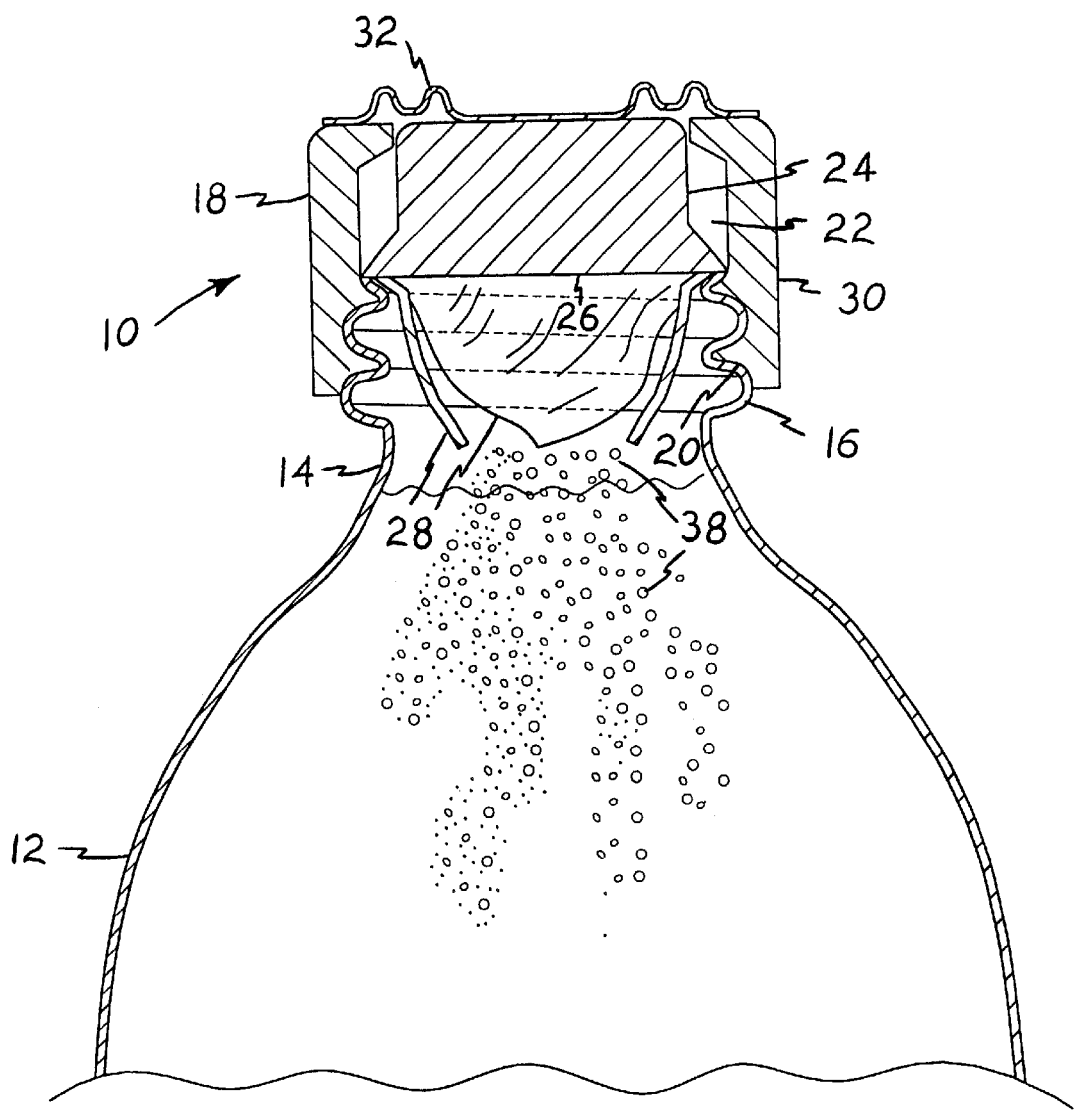
FIG. 3 is a detailed elevation view in section of the cap assembly of FIG. 1 after use, showing the deployment of a powdered drink mix contained therein into the water of the bottle.

FIGS. 1 through 3 illustrate the first embodiment of the present invention, wherein a specially configured cap assembly 10 is provided with a container 12 of bottled water. The water bottle 12 is conventional with the exception of its cap assembly 10, with a relatively narrower neck portion 14 including an externally threaded area 16 (shown in FIGS. 2 and 3) or other means (flange, etc.) for positively but removably securing the cap assembly 10 thereto. While it will be seen that the present invention may be applied to virtually any practicable size of container, including wide mouth jars and the like, the present invention is preferably applied to conventional personal size water bottles having a capacity on the order of a quart or so, or generally less.

The cap assembly 10 comprises an outer cap portion 18 having an internal mating attachment area (threads 20, etc.) providing positive but removable attachment to the bottle neck 14. The outer cap 18 has an open central chamber 22 with a concentric plunger 24 extending from the upper end 26 thereof and closely fitting within the chamber 22. The open chamber 22 is closed by the lower end 26 of the plunger 24 at its upper end, and by a burstable seal 28 which extends across the fastener end 30 of the outer cap 18. The wall of the outer cap 18, plunger 24, and lower seal 28 define the beverage mix containment chamber 22 therebetween. A quantity of a dry drink mix is sealed within the beverage mix containment chamber 22 and precluded from contact with the water within the bottle 12 by the lower seal 28. An upper seal 32 may be placed over the top of the cap assembly 10 and plunger 24 to preclude tampering, etc.

The beverage mix contained within the mix containment chamber 22 may be virtually any type of powdered or concentrated beverage or drink mix desired. In FIG. 2, two tea bags 34 are shown wherein said tea bag(s) includes means for securing said tea bag(s) to the cap assembly for retrieval of said tea bag(s) from the bottle after deployment therein. The tea bags 34 may include strings 36 extending to the lower end 26 of the plunger 24 (or other area of the cap assembly 10), in order to withdraw the tea bags 34 from the bottle 12 after the bags 34 have been deployed within the bottle 12. Alternatively, the chamber 22 may include a loose powdered mix 38, as illustrated in FIG. 3 of the drawings. The specific beverage concentrate is not critical to the nature of the present invention; virtually any type of concentrated beverage mix, including syrups or other concentrated liquids, may be placed within the cap assembly 10 as desired.

The cap assembly 10 and water bottle 12 assembly of FIGS. 1 through 3 of the drawings is used as indicated in FIG. 1, by compressing the upper end of the plunger 24 downwardly into the outer cap portion 18, as by pushing or hitting downwardly with the heel of the hand H, or otherwise compressing the plunger 24 downwardly. The result is as shown in FIG. 3 of the drawings, with the plunger 24 pushed downwardly through the chamber 22 to either contact the lower seal 28 directly or force the drink mix 38 downwardly against the lower seal 28, thereby rupturing or bursting the seal 28 to distribute the drink mix 38 into the interior of the bottle 12 to mix with the water therein. When the beverage mix 38 is completely mixed (or the tea 34 has steeped or brewed to the desired strength), the cap assembly 10 is removed for the user to consume the beverage within the bottle 12.

Figure 4:
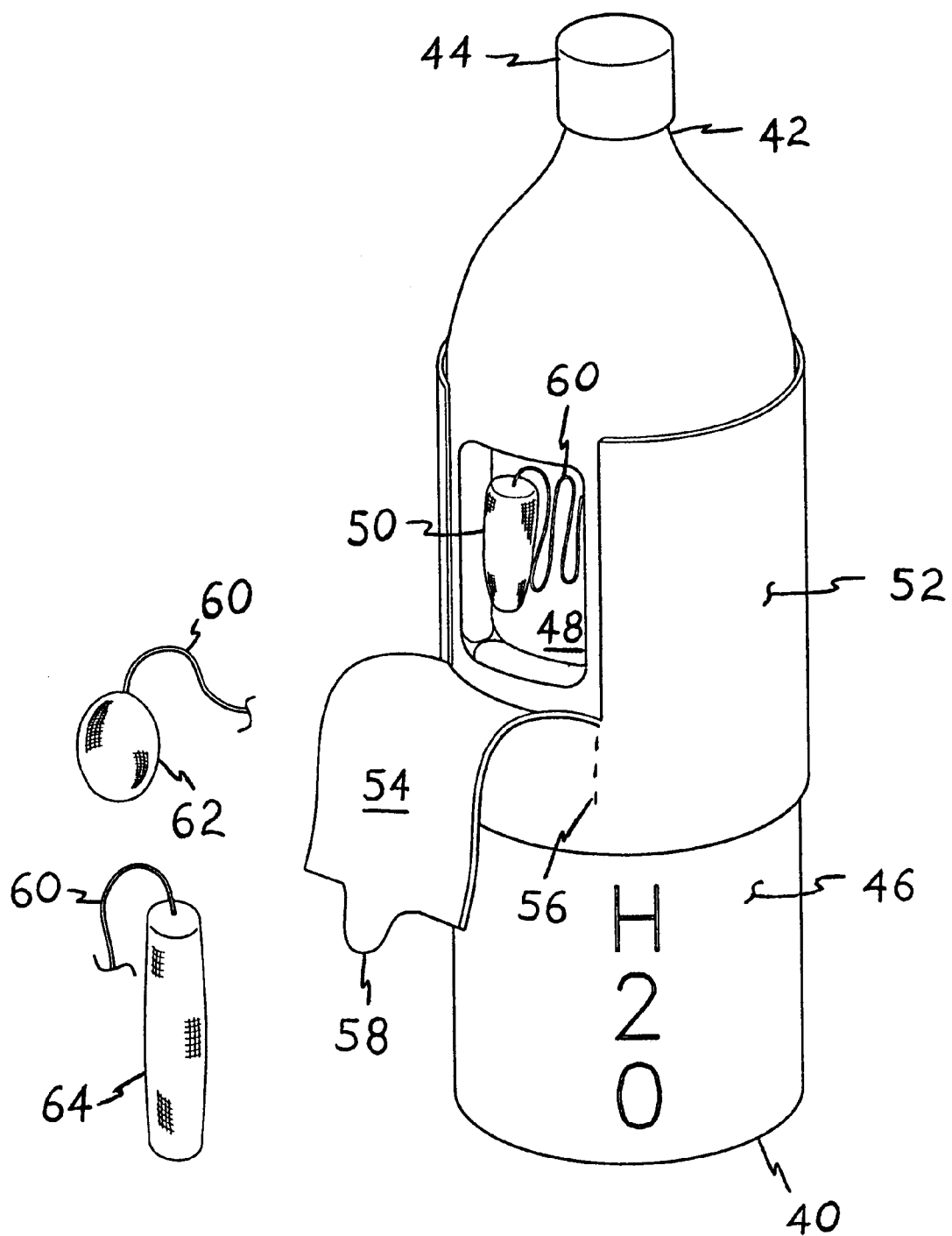
FIG. 4 is a perspective view of another embodiment, showing a bottle with a receptacle in one side thereof for containing drink mix or tea packets and sealed by a removable label, and further illustrating various drink mix packet shapes for insertion in the bottle neck.

FIG. 4 illustrates another embodiment of the present invention, wherein a beverage mix, concentrate, or the like is provided in combination with a personal size container of bottled water. The water bottle 40 of FIG. 4 is constructed generally along the lines of the bottle 12 of FIGS. 1 through 3, having a relatively narrow neck portion 42 including conventional means for positively and removably securing a conventional cap 44 thereto. (The cap securing means is not illustrated in FIGS. 4 through 6 of the drawings, but may be the same means as illustrated in FIGS. 2 and 3 and discussed further above.) The bottle 40 also includes a side wall 46 defining the size and shape of the bottle 40. However, the side wall 46 has a beverage mix containment pocket or receptacle 48 formed therein, with the side wall 46 being a single, integral sheet defining a continuous side wall 46 and wall for the pocket 48, thus separating the contents of the water bottle 40 from the beverage mix contained within the pocket 48.

A suitable quantity of a beverage mix or concentrate, dry powder, etc. is placed within the beverage containment pocket 48 for storage therein until needed for mixing with the water within the bottle 40. In the example of FIG. 4, a first tea bag 50 is shown within the pocket 48. Again, virtually any suitable type of beverage mix may be used, however. The label 52 surrounding the bottle 40 includes a removable, or semi-removable, cover section 54 disposed over the pocket 48, separable from the remaining label 52 by lines of weakening or perforations 56 along each side thereof. A pull tab 58 is provided at one edge, for pulling the cover 54 open.

When a user wishes to prepare a drink using the bottle 40 and drink mix provided therewith, he or she need only remove the cover section 54 of the label 52 by pulling upon the pull tab 58 to expose the drink mix stored within the pocket or receptacle 48 and beneath the removable portion 54 of the label 52. The cap 44 is removed from the neck 42 of the bottle 40, and the drink mix is placed in the bottle for mixing or brewing, as appropriate.

It will be noted that the tea bag 50 stored within the pocket 48 of the bottle 40, has an elongate, generally cylindrical shape with a tapered end opposite its attachment to its retrieval string 60. This provides a reasonable volume of tea within the bag 50, while still keeping the outside dimensions of the bag 50 relatively compact in order to provide for ease of insertion into the relatively narrow neck 42 of the bottle 40. The retrieval string 60 may be secured within the pocket 48 as desired, or the bag 50 may be left within the bottle 40 for discarding with the empty bottle 40 as desired. Alternate shapes of tea bags are also shown in FIG. 4, with a generally spherical or oblate bag 62 and a narrow, cylindrical bag 64 being shown to the left of the bottle 40. It will be understood that any of these shapes, or others, may be provided with the bottle 40 as desired, for ease of insertion into the bottle 40. While these shapes do not provide the desired surface area to volume ratio to diffuse the tea more rapidly, they do allow the bag to be inserted into the bottle 40 with ease and do not require the bag to be compacted for insertion. Any of the tea bags 50, 62, and/or 64 may include a retrieval string 60 as desired.

Figure 5:
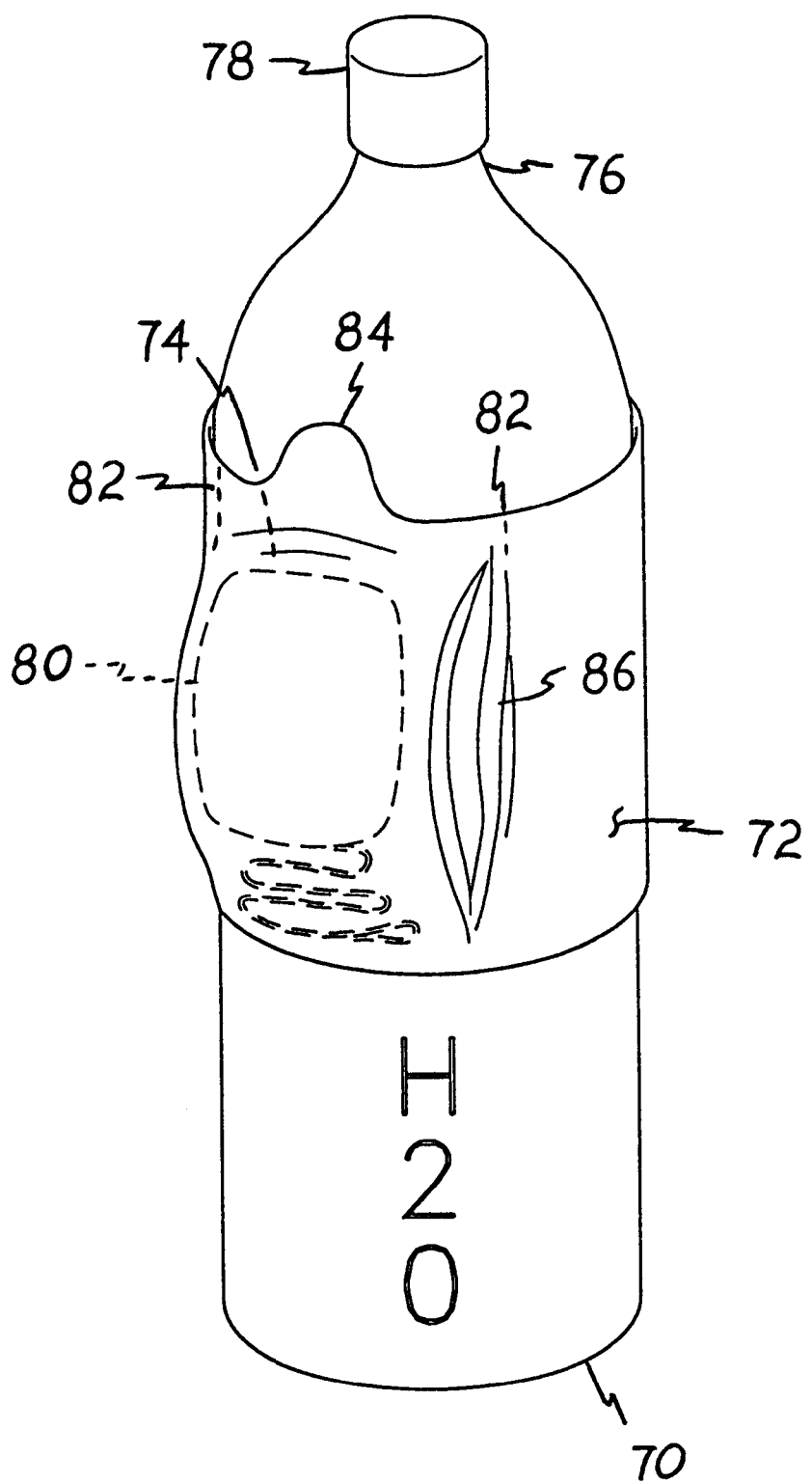
FIG. 5 is a perspective view of yet another embodiment, wherein the label is formed with a pocket therein for holding one or more drink mix packets therein against the side of the bottle.
Figure 6:
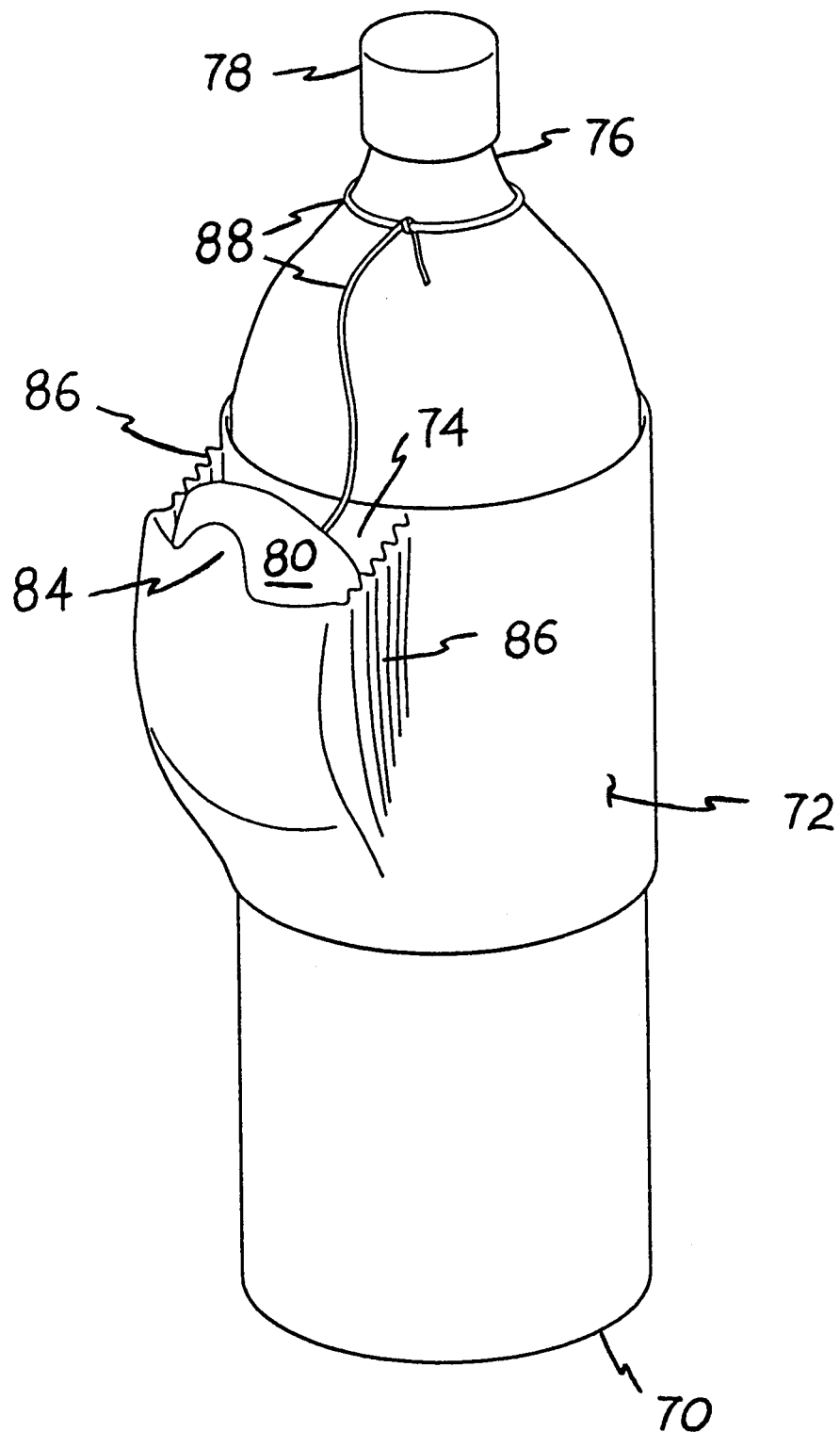
FIG. 6 is a perspective view of the bottle and pocket label of FIG. 5, after opening.

FIGS. 5 and 6 of the drawings illustrate yet another embodiment of the present invention, wherein a conventional water bottle 70 includes a label 72 having a pocket 74 formed therein for storing a quantity of drink mix therein. The bottle 70 is conventional, including a narrow neck portion 76 with a cap 78 and conventional removable securing means for the cap 78 as illustrated in FIGS. 2 and 3. A quantity of beverage mix (tea bag 80 of any suitable shape or configuration, e. g., bags 50, 62, or, 64 of FIG. 4, or a powdered drink mix as shown in FIG. 3) is stored within the sealed pocket for use by a consumer as desired.

The label 72 includes certain features similar to those of the label 52 of FIG. 4, i. e., tear lines 82 disposed along each side of the pocket 74 and a pull tab 84 extending from one edge of the label 72. The pocket 74 includes additional folded material 86 along each side thereof, to provide "accordion" or fan type laterally folded edges when the pocket 74 is opened, as shown in FIG. 6 of the drawings. When the pocket 74 is opened by pulling the pull tab 84 to tear the lateral edges of the pocket 74 along the tear lines 82, as shown in FIG. 5, the fan or accordion fold sides 86 allow the pocket 74 to expand, thereby providing access to the tea bag 80 or other drink mix stored therein. The tea bag 80 may be secured to the bottle 70 by means of a retrieval string 88 secured about the neck 76 of the bottle 70, as shown in FIG. 6, or otherwise secured for retrieval from the bottle 70 after use. The expanded pocket 74 also provides an excellent storage compartment for disposing of the tea bag 80 after use.

In summary, the present methods and apparatus for making or brewing a personal quantity of beverage in a personal size water bottle, provide a much needed means of providing a personal quantity of freshly brewed "sun tea," or other beverage according to the packet or mix provided. As has been noted at various points above, the present invention is adaptable to virtually any type of powdered drink mix or even a syrup concentrate, in virtually any flavor as desired. However, it is particularly adaptable to use with tea, as it is well known that the flavor of tea deteriorates over a period of time due to the tannic acids of the tea and other factors, and that pre-brewed, canned or bottled tea beverages just do not have the fresh flavor of freshly brewed tea. Accordingly, the present invention provides a means of achieving the freshly brewed tea flavor in a personally manageable quantity of drink.

While the above disclosure has described a few different embodiments of the present invention, it will be seen that the above embodiments may be mixed and combined to form many additional permutations and combinations of the present invention. For example, the accordion fold pocket 74 of FIGS. 5 and 6 may be combined with the bottle 40 with its receptacle 48 of FIG. 4, with the pocket 74 either aligned over the receptacle 48 or offset to one side thereof, as desired. In another alternative, the pocket 74 of the assembly of FIGS. 5 and 6 may be eliminated entirely, with the tea bag 80 being secured to the bottle 70 merely by means of the retrieval string 88.

Another variation of the present invention may provide for the sealed pocket containing the tea or drink mix to be secured adhesively to the side of the bottle in any of the above described embodiments, thereby foregoing any requirement for a separate label. The information normally associated with such a label may be printed directly upon the bottle and/or cap of the assembly. The information (either printed directly upon the bottle, or upon a separate label attached to the bottle) may include a brand name and logo, type of tea or flavor of the beverage concentrate provided with the bottle, etc.

Also, the label may include some means for the user to determine when the tea has been brewed to the proper consistency, if desired. A sticker, or printed area, having a color indicating the desired color of the tea when brewing is complete, may be provided on the bottle or label, or the cap may be colored appropriately as desired. Such a brewing consistency label may include different shades, to allow the consumer to brew the tea to a light, medium, or darker brew, as desired. Whichever of the above described embodiments are used, the consumer of bottled water now has a choice of beverages which may be mixed or brewed with such water, to provide a freshly mixed or brewed beverage in a personal size container, which was previously not available to the consumer.

It is to be understood that the present invention is not limited to the embodiments described above, but encompasses any and all embodiments within the scope of the following claims.

I claim:

1. A drink mix apparatus, comprising:

a water bottle with a personal size quantity of water therein;

said water bottle having a narrow neck;

said neck including means for positively and removably securing a cap thereto;

a cap assembly;

said cap assembly having an outer portion including means for mating with said neck securing means;

said outer portion of said cap assembly further having a lower end with burstable seal means extending thereacross;

said cap assembly further having a plunger portion closely fitting within said outer portion, and defining a beverage mix containment chamber therein sealed from said water within said bottle by said seal means; and a quantity of dry drink mix disposed within said beverage mix containment chamber;

wherein said dry mix comprises at least one tea bag and said at least one tea bag includes means for securing said at least one tea bag to said cap assembly for retrieval of said at least one tea bag from said bottle after said dry drink mix is distributed into said water of said bottle when said plunger portion of said cap is forced downwardly, thereby rupturing said seal means and opening said beverage mix containment chamber to said water within said bottle.

2. The drink mix apparatus according to claim 1, including upper sealing means disposed across said outer portion and across said plunger portion of said cap assembly.

3. The drink mix apparatus according to claim 1, wherein said mating means includes threaded areas disposed within said outer portion of said cap assembly.

* * * * *